(12) United States Patent
Mickael

(10) Patent No.: US 6,665,616 B2
(45) Date of Patent: *Dec. 16, 2003

(54) METHOD FOR DETERMINING DECAY CHARACTERISTICS OF MULTI-COMPONENT DOWNHOLE DECAY DATA

(76) Inventor: Medhat W. Mickael, 4910 Randall Oak Dr., Sugar Land, TX (US) 77478

(*) Notice: Subject to any disclaimer, the term of this patent is extended or adjusted under 35 U.S.C. 154(b) by 0 days.

This patent is subject to a terminal disclaimer.

(21) Appl. No.: 10/066,839

(22) Filed: Feb. 4, 2002

(65) Prior Publication Data

US 2003/0009288 A1 Jan. 9, 2003

Related U.S. Application Data

(60) Provisional application No. 60/284,336, filed on Apr. 17, 2001.

(51) Int. Cl.[7] .............. G01V 5/04; G01V 3/00; G01V 5/10; G01V 5/08
(52) U.S. Cl. .......... 702/8; 324/303; 250/269.7; 250/269.8; 250/269.6; 250/269.2
(58) Field of Search .............. 250/270, 269.6, 250/269.8, 269.7, 269.2; 324/303; 702/8

(56) References Cited

U.S. PATENT DOCUMENTS

| | | | |
|---|---|---|---|
| 4,151,413 A | 4/1979 | Arnold | 250/270 |
| 4,409,481 A | 10/1983 | Smith, Jr. et al. | 250/269.7 |
| 4,814,610 A | 3/1989 | Attali et al. | 250/269 |
| 5,517,115 A * | 5/1996 | Prammer | 324/303 |
| 5,764,058 A * | 6/1998 | Itskovich et al. | 324/303 |
| 5,973,321 A | 10/1999 | Schmidt | 250/269.6 |
| 2003/0006769 A1 * | 1/2003 | Edwards | 324/303 |
| 2003/0009288 A1 * | 1/2003 | Mickael | 702/8 |

OTHER PUBLICATIONS

Nezamzadeh, Marzieh "Multicomponent Spin–Spin Relaxation (T2) Data Analysis by Least Squares Methods" Computational Physics (75.502) from the internet website: http://www.physics.carleton.ca/courses/75.502/slides/projects/2001/nezamza.*

R M West and R A Williams "Opportunities for Data Fusion in Multi–Modality Tomography" 1st Worlds Congress on Industrial Process Tomography, Buxton Greater Manchester pp. 195–200 Apr. 14th–17th 1999.*

* cited by examiner

Primary Examiner—Diego Gutierrez
Assistant Examiner—Tiffany A. Fetzner

(57) ABSTRACT

Measurements from many logging instruments such as Gamma ray counts from a pulsed neutron instrument, typically have a spectrum that contains a plurality of exponentially decaying components. The slowest decaying component is obtained by fitting a single exponential over the tail end of the data and selecting a beginning for the fitting window that minimizes the product of the chi-square and the standard error of the fit. The single determined component may be subtracted from the data and the process repeated to give additional components. The determined components are indicative of thermal neutron capture cross-sections.

6 Claims, 4 Drawing Sheets

METHOD FOR DETERMINING DECAY CHARACTERISTICS OF MULTI-COMPONENT DOWNHOLE DECAY DATA

CROSS REFERENCES TO RELATED APPLICATIONS

This application claims priority from U.S. Provisional Patent Application Ser. No. 60/284,336 filed on Apr. 17, 2001.

BACKGROUND OF THE INVENTION

1. Field of the Invention

The invention is related to the field of interpretation of data from well logging instruments comprising a plurality of exponentials. More specifically, the invention is related to methods of processing measurements from a pulsed neutron well logging instrument for determining various properties of earth formations penetrated by a wellbore. The processing method enables separating various components of the signals from the instruments to obtain parameters of interest.

2. Background of the Art

Pulsed neutron well logging instruments are known in the art for determining the macroscopic thermal neutron capture cross-section of earth formations penetrated by a wellbore. A typical pulsed neutron well logging instrument is described, for example, in a sales brochure entitled PDK-100, Western Atlas Logging Services, Houston, Tex. (1994). Typical pulsed neutron instruments include a controllable source of high-energy neutrons, and one or more gamma ray radiation detectors positioned at spaced apart locations from the neutron source. The source is periodically activated to emit controlled-duration "bursts" of high- energy neutrons into the earth formations surrounding the well borehole. The neutrons interact with atomic nuclei of the materials in the earth formations, losing energy with each interaction until the neutrons reach the thermal energy level (defined as having a most likely energy of about 0.025 electron volts). Depending on the material composition of the earth formations proximal to the instrument, the thermal neutrons can be absorbed, or "captured". at various rates by certain types of atomic nuclei in the earth formations. When one of these atomic nuclei captures a thermal neutron it emits a gamma ray, referred to as a "capture gamma ray".

The rate at which the capture gamma rays are emitted, with respect to the elapsed time after the end of the neutron "burst" depends on, among other things, the relative concentration per unit volume in the earth formations of atomic nuclei which have a relatively large tendency to absorb thermal neutrons and emit capture gamma rays in response. This tendency is referred to as the thermal neutron capture "cross-section". A common chemical element found in earth formations having high capture cross-section atomic nuclei is chlorine. Chlorine in earth formations is usually present in the form of chloride ion in solution in connate water present in the pore spaces of some of the earth formations. Chlorine has a very high thermal neutron capture cross- section. Thus a measurement of the thermal neutron decay time (or neutron lifetime) of the earth formations in the vicinity of the wellbore can be indicative of amount of saline fluid present in the pore spaces of the earth formation. When combined with values of connate water salinity, fractional volume of pores space ("porosity"), and measurements of the fractional content of fine gained particles in the formation ("formation shaliness") it is possible to determine the fractional fluid saturation of useful materials, such as oil or gas, present in the pore spaces of the earth formation.

It has proven difficult to determine the fractional saturation of oil or gas under certain wellbore conditions by processing the capture gamma ray measurements according to methods known in the art for determining the thermal neutron capture cross-section, $\Sigma_f$ of the earth formation of interest. Several factors contribute to the difficulty of determining $\Sigma_f$ using the methods known in the art. First, the well logging instrument is typically inserted into a wellbore which is filled with liquid. At the time the pulsed neutron instrument is typically used, the wellbore generally has inserted therein a steel liner or casing. The liner or casing is generally held in place by cement filling an annular space between the wellbore wall and the exterior of the liner or casing. As high energy neutrons leave the neutron source in the logging instrument, the liquid in the wellbore has the effect of rapidly moderating (or slowing down) the high energy neutrons to the thermal level because of the high concentration of hydrogen nuclei in the liquid.

In general, the relative numbers ("population") at any particular time after a neutron burst, of thermal neutrons in the wellbore and in the earth formations proximal to the wellbore will depend on the porosity and on the hydrogen nucleus concentration per unit volume within the earth formation. The thermal neutrons present in the wellbore and in the earth formations can be "captured" or absorbed by nuclei of various chemical elements in the wellbore and formations, at a rate which depends upon the relative concentration and on the thermal neutron capture cross-section of these elements. In wellbores and in earth formations some of the more common elements having high thermal neutron cross-sections include chlorine, hydrogen, iron, silicon, calcium, boron, and sulfur. The thermal neutron decay time or "neutron lifetime", as determined from measurements of capture gamma rays made by the well logging instrument, represents combined effects of the thermal neutron capture cross-section in each of several "regions"(volumes of space surrounding the logging instrument) within the wellbore as well as from the earth formations proximal to the wellbore. These regions generally include the instrument itself, the fluid in the wellbore, the steel casing, the cement, the earth formation radially proximal to the wellbore wall (which may have been infiltrated by fluid from within the wellbore), and the earth formations radially more distal from the wellbore wall (which have minimal infiltration from the fluid in the wellbore).

Determining $\Sigma_f$ using data processing methods known in the art can be further complicated if the earth formation does not have a truly homogenous material composition on the scale of measurements made by the well logging instrument. Conditions in the earth formations subject to this difficulty can include earth formations consisting of a layered "sand/shale" sequence wherein the layers are on the order of 3–4 inches thick, or can include the presence of a fluid transition zone such as a gas/oil or an oil/water contact in the earth formation. Other conditions can include the presence of a radial zone located within approximately 2–8 inches from the wellbore wall having a different fluid than in a radially more distal zone, this being familiar to those skilled in the art as being caused by such processes as "invasion"(the previously described fluid infiltration), and gas or water "coning" as well as other processes known in the art.

The capture gamma ray detection rate as measured by the logging instrument will necessarily include fractional contributions from all of the regions in the vicinity of the logging instrument. Each of these regions has an indeterminate fractional contribution to the overall capture gamma ray counting rate as measured by the logging instrument, and can also have an unknown value of capture cross-section Several processing methods are known in the art for determining the macroscopic thermal neutron capture cross-section of the formation, $\Sigma_f$, from the measured capture gamma ray counting rates with respect to time after the end of each neutron burst (referred to as the counting rate "time spectrum" or "decay spectrum"). Prior art processing methods included the assumption that the thermal neutron capture cross-section of the regions within the wellbore are significantly higher than the capture cross-section of the surrounding earth formations. Limitations to these methods are described, for example, in U.S. Pat. No. 4,409,481 issued to Smith et al.

The processing method described in the Smith et al patent includes the assumption that the decay of the gamma ray counting rate with respect to time includes the effects of two and only two distinct exponential decay rates, the first caused by the materials within the wellbore and the second caused by the materials in the earth formations proximal to the wellbore. The method described in the Smith et al patent includes the assumption that the length scales of the materials in the wellbore and in the earth formation are such that the effects of neutron diffusion averages out the actual variations in capture cross-section between the various regions and therefore can be represented by some average value of thermal neutron capture cross-section. As discussed previously, several common conditions exist where this is clearly not the case. Using the processing method described in the Smith et al patent can lead to erroneous results under these conditions.

U.S. Pat. No. 5,973,321 to Schmidt describes a model based method for inversion of thermal neutron decay data. The method includes generating a data kernel which is made up of representors, or models, of potential decay components of the wellbore and of the earth formations in the vicinity of the wellbore. A thermal neutron decay spectrum is measured by a pulsed neutron instrument including a controllable source of high energy neutrons and one or more gamma ray detectors at spaced apart locations from the source. The decay spectrum measured by the instrument is inverted to determine model parameters by which the individual representors are scaled so that when combined, the scaled representors most closely match the measured decay spectrum. A potential disadvantage of model based inversion methods such as that taught by Schmidt is that the curve fitting may give different results depending upon the choice of the model used to generate the data kernel.

There is a need for a method of determination of the components of thermal neutron decay that does not use any predetermined models. The present invention satisfies this need.

SUMMARY OF THE INVENTION

The present invention is a method for obtaining parameters of interest of subterranean earth formations using measurements that comprise two or more exponentially decaying functions of time, such as those made using a pulsed neutron logging tool. A fit is made using a single exponential to the tail end of the data and the beginning of the fitting window is selected so that a product of the goodness of fit and the standard error of the fit attains a minimum. The process may be used for determination of thermal neutron capture cross section. By subtracting the determined fit from the measurements, the process may be repeated to find additional components of the decay spectrum.

DETAILED DESCRIPTION OF THE INVENTION

A pulsed neutron well logging instrument which can provide thermal neutron capture gamma ray measurements suitable for use with the method of this invention is described in a sales brochure entitled, PDK-100, Western Atlas Logging Services, Houston, Tex. (1994). It is to be understood that the invention is not limited to processing measurements made by the instrument described in this reference, but can also be used with measurements made by other sensor arrangements such as a pulsed neutron measurement-while-drilling (MWD) instrument, or a pulsed neutron sensor permanently emplaced either within a wellbore or permanently emplaced within, above, or below a subterranean reservoir in earth formations but not located within a wellbore.

Figure 1:
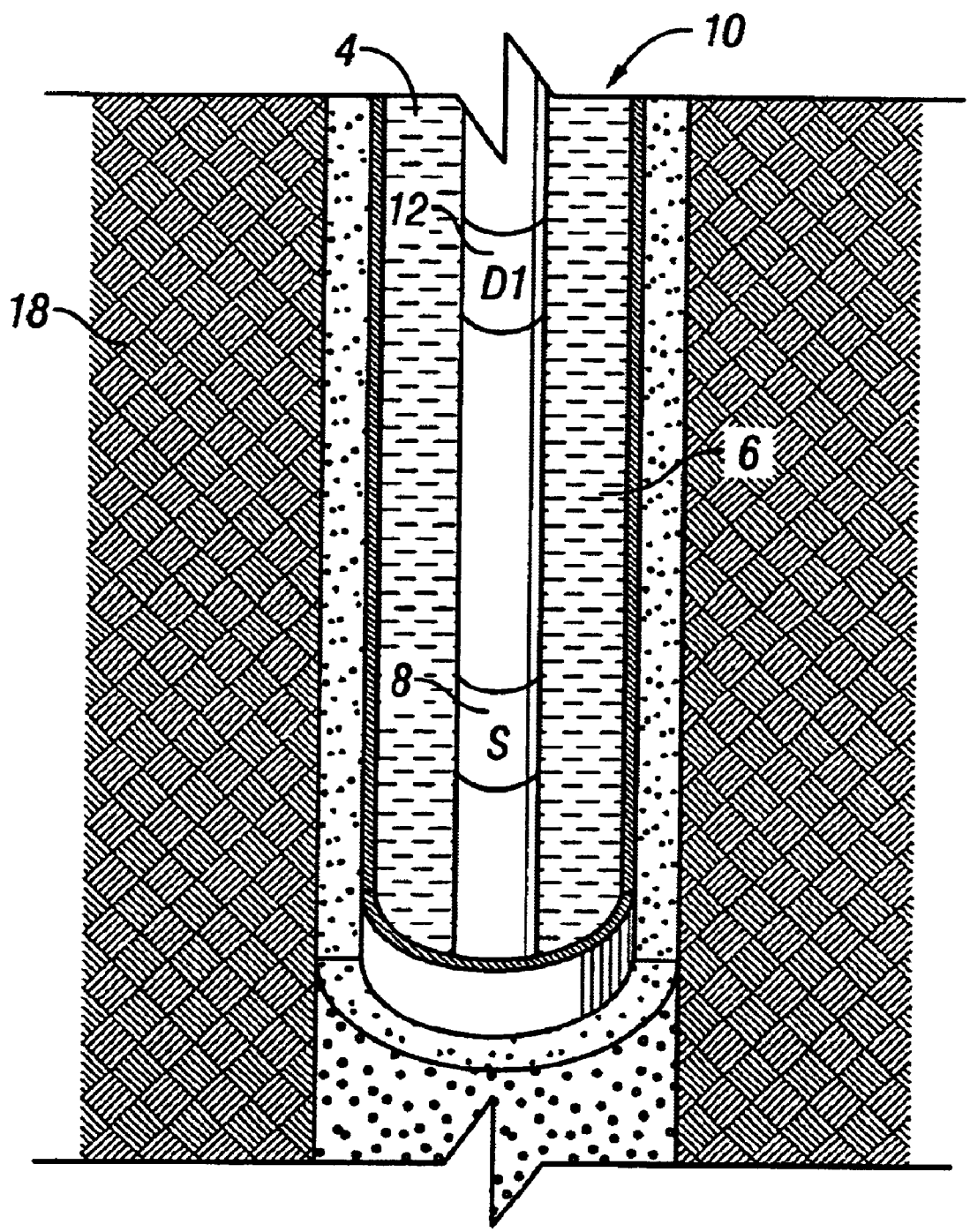
FIG. 1 shows various regions within the wellbore and in the vicinity of the wellbore, including a pulsed neutron logging instrument positioned in the wellbore.

The well logging instrument described in the PDK-100 reference includes a controllable source of high-energy neutrons, and gamma ray detectors positioned at spaced apart locations from the neutron source. Referring to FIG. 1, the well logging instrument 10 is typically inserted into a wellbore 4 penetrating earth formations 18. The wellbore 4 is generally filled with a liquid 6 of some type familiar to those skilled in the art. The instrument's 10 source 8 is periodically energized to produce short, controlled duration "bursts" of high-energy neutrons which interact with the earth formations 18 surrounding the instrument 10. Through interaction with the liquid 6 in the wellbore 4 and with the earth formations 18, the neutrons are reduced in energy to the thermal level, where they are susceptible to capture by atomic nuclei which have a high thermal neutron capture cross-section. Such a nucleus emits a "capture" gamma ray when it captures a thermal neutron, and the gamma ray may be detected by one of the detectors, one being shown at 12, on the well logging instrument 10. The manner of using the pulsed neutron logging instrument to obtain unprocessed capture gamma ray counting information about the earth formations is well known in the art.

The pulsed neutron well logging instrument 10 also typically includes circuits for counting the numbers of gamma rays detected by each one of the detectors 12. These circuits generally include the capability for determining some measurement of the time at which each gamma ray is detected with respect to the beginning (or end) of the neutron burst. The pulsed neutron well logging instrument can also include circuits for transmitting signals to the earth's surface which correspond, for each detector 12, to the numbers of gamma rays detected and the relative time of detection of the gamma rays. The well logging instrument 10 can alternatively, or in combination with the transmitting circuits, include other circuits used for storing signals corresponding to the gamma rays detected, for subsequent processing within the well logging instrument 10 itself. It should clearly be understood that the process of this invention may be performed within circuits located within the logging instrument itself, and that transmission of the gamma ray detection signals to the earth's surface for processing at the earth's surface is not meant to be a limitation on this invention.

A particularly useful feature of the well logging instrument described in the PDK-100 reference as it concerns this invention is that the gamma rays detected by the instrument are segregated into about 100 discrete, short-interval time windows, called "gates". Each gate corresponds to a different time interval after the end of the neutron burst. As will be further explained, determining the gamma ray counting rates in a relatively large number of short-duration gates after each neutron "burst" can substantially improve the ability to determine characteristics of the earth formations which are related to the capture gamma ray counting rates. It should be clearly understood that the number of gates into which the detected gamma rays are segregated is not a limitation on the invention. More or fewer gates may be used than as described in the PDK-100 reference, however using more, shorter duration gates may provide the advantage of being able to better resolve a plurality of individual, exponentially-decaying components in the materials surrounding the instrument. These components each can partially contribute to the overall gamma ray counting rate measured during the time span from the end of the neutron burst to the beginning of the subsequent neutron burst. For purposes of this invention it is unnecessary for the gates to be absolutely contiguous in time and to have equal time duration. However, the statistical accuracy of the results calculated using the method of this invention can be improved if the amount of "dead time" between bursts for which no counts are measured is kept to a minimum.

Figure 2:
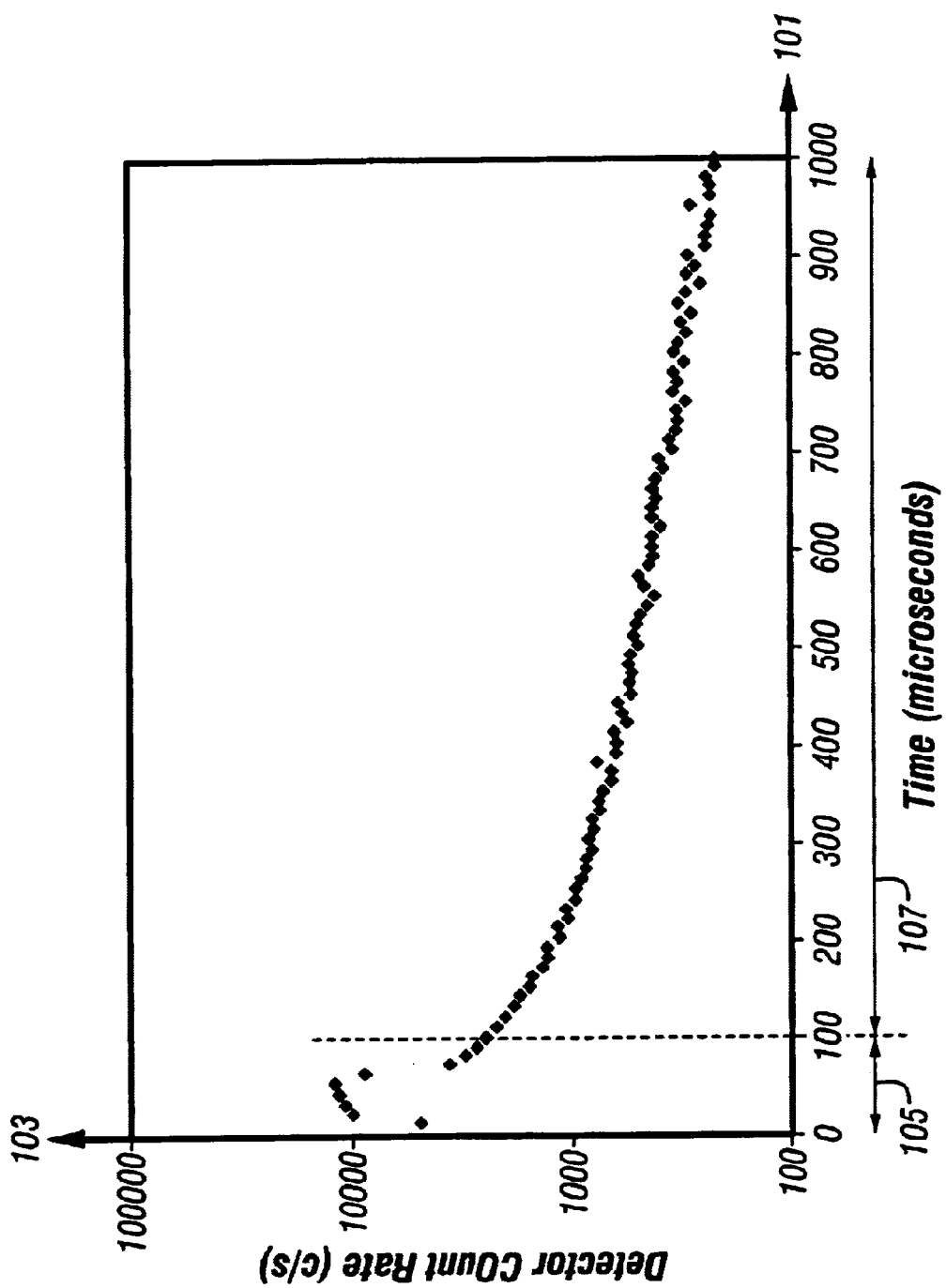
FIG. 2 shows a typical time decay spectrum of neutron counts.

Turning now to FIG. 2, a typical time decay spectrum recorded in the detector is shown in FIG. 2. The abscissa 101 is time, with a total of 1000 $\mu$s is of data being shown while the ordinate 103 is the detector count rate (the number of samples counted within a short duration gate. In a preferred embodiment of the invention, each of the short duration gates has a length of 10 $\mu$s. Note that the scale on the ordinate is a logarithmic scale.

The early portion (typically 100 $\mu$s) of the decay spectrum denoted by 105 us dominated by the source burst and is not useful for the determination of formation or borehole parameters. The latter portion of the decay spectrum 107 extending from 100 $\mu$s to 1000 $\mu$s is representative of the neutron decay in the environment surrounding the tool.

In most commonly encountered situations, the capture cross section of the borehole fluid is typically higher than the capture cross section of the formation. The capture cross section of the borehole usually ranges from about 22 c.u. for fresh water or oil in the borehole to about 150 c.u. for fully saturated saltwater. On the other hand, the formation capture cross section ranges from about 5–7 c.u. for a zero p.u. to about 65 c.u. for a shale.

The decay spectrum contains many modes due to neutron decay in different regions. Separation of these decay modes is not easy due to the nonlinear nature of the governing equations. The solution of these nonlinear equations is slow, requires fairly good initial estimates, and is prone to failure in low contrast situations where different decay modes are similar.

Many attempts have been made in the past to determine the formation capture cross sections from the late portion of the spectrum assuming that after a certain time, there is no contribution from the borehole. The simplest approach is to determine the formation capture cross section from a single exponential fit in a fixed time gate within a time gate that starts between 400 and 600 $\mu$s and ends at 1000 $\mu$s. This approach suffers from three problems:

1. low capture cross section boreholes where the borehole decay is relatively low, it may determine an erroneous formation capture cross section,
2. The statistical significance of the determined formation capture cross section in high capture cross section situations may be poor, and
3. The method may not be able to identify properly the borehole and the formation capture cross sections when the former is less than the latter.

The present invention determines the formation capture cross section from the late portion of the decay spectrum by determining the length of a variable length gate at the tail end of the spectrum that gives single exponent fit to the spectrum with high statistical significance.

The detector response as a function of time after the burst can be approximated by $$y_i = \sum_j A_j e^{-\Sigma_j v t_i} \tag{1}$$

where $y_i$, is the detector count rate in the i-th window, and $\Sigma_j$, j=1, 2, ... n are the capture cross sections of n decay modes while $A_j$ is the weight associated with the j-th decay mode, v is the thermal neutron speed and $t_i$, is the average time of the i-th channel.

To illustrate the method of the present invention, the method is discussed here for the case of n=2 components:, those versed in the art would recognize how the method of the present invention could be used for more than two components.

For the case of two decay modes, the detector count from eq. (1) may be rewritten as $$y_i = A_1 e^{-\Sigma_1 v t_i} + A_2 e^{-\Sigma_2 v t_i} \tag{2}$$

Assuming that the first decay mode decays faster than the second mode ($\Sigma_1 >> \Sigma_2$) there is a time T after which eq. (2) may be written as $$y_i = A_2 e^{-\Sigma_2 v t_i} \quad t_i > T \tag{3}$$

This may be rewritten as $$\log(y_i) = \log(A_2) - \Sigma_2 v t_i = A'_2 - \Sigma_2 v t_i \tag{4}$$

It is well known that a least squares solution of eq. (2) for times greater than T may be used to determine both $\Sigma_2$ and $A'_2$. In the present invention, such a least squares fit is performed for the latter part of the decay spectrum for various values of the starting time T. Next, the residual Chi-square ($\chi_T^2$) and the standard error of the fit ($\sigma^{T2}$) are determined using the well-known equations $$\chi_T^2 = \frac{1}{N - I_T - 2} \sum_{i=I_T}^{N} \left[ \log(y_i) - A'_2 + \sum_2 v t_i \right] \tag{5}$$

and $$\sigma_T^2 = \frac{N - I_T}{\sum_{i=1}^{N} \sigma_i^2} \tag{6}$$

where N is the number of data points (from time the starting time T) in the fitting, $I_T$ is the window number corresponding to the starting time, and $\sigma_i$ is the fitting error for the i-th data point.

Figure 3:
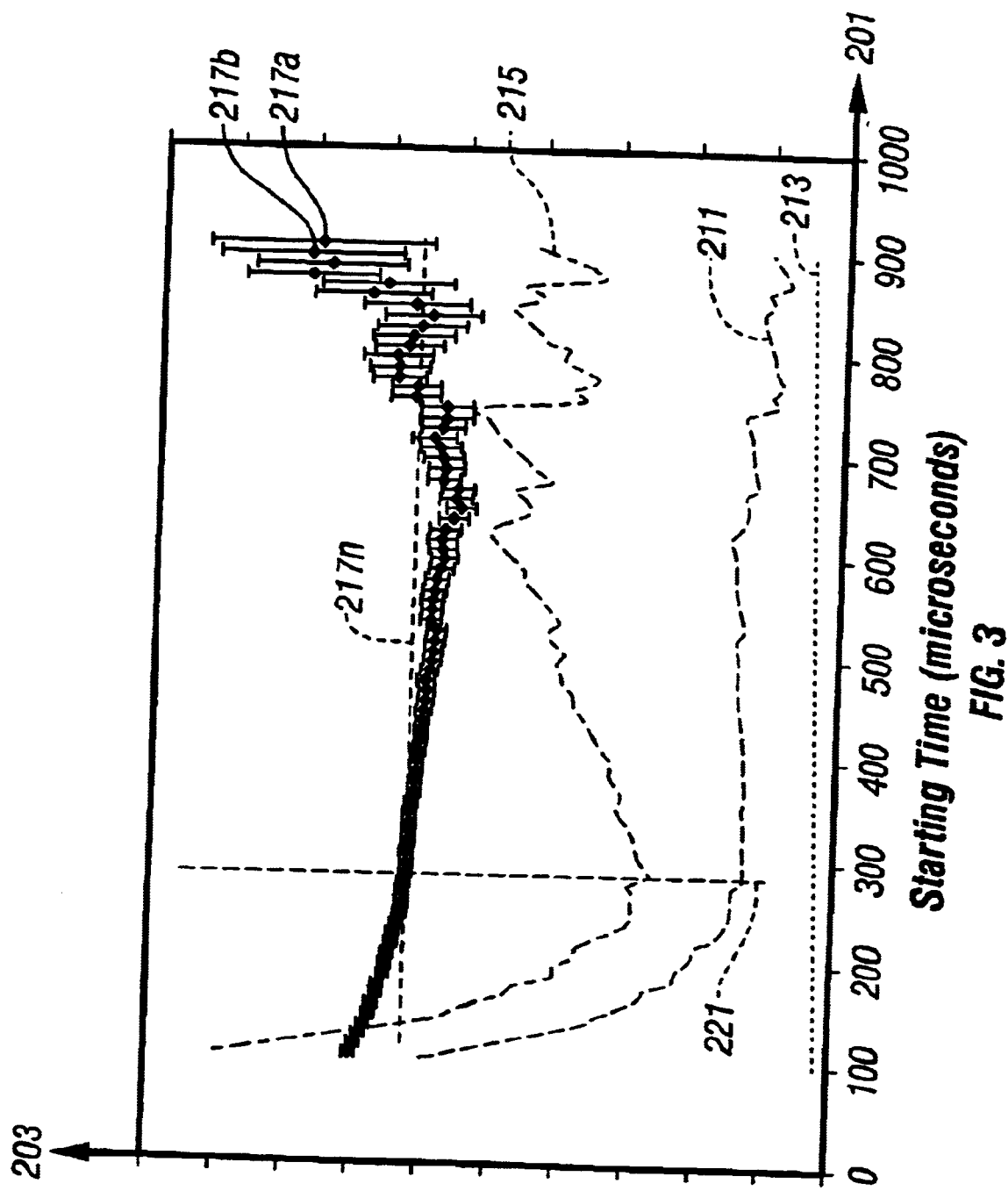
FIG. 3 shows analysis of data of a decay spectrum using the method of the present invention.

Turning now to FIG. 3, plots are shown of the Chi-square $\chi_T^2$ 211 and the standard deviation of the fit 213 (from eqs. 5 and 6) as a function of the starting time of the fitting procedure. The abscissa 201 is the starting time and the ordinate 203 the value of the function being plotted as described below. FIG. 3 shows that the $\chi_T^2$ decreases as a function of the starting time T and reaches a minimum when the starting time is substantially equal to the ending time of the spectrum (1000 μs). This is due to the fact that as the starting time gets closer to the burst at small values of the starting time T, the function describing the decay is no longer a single exponential but rather a multi-component exponential.

On the other hand, FIG. 3 shows that the $\sigma_T^2$ given by 213 increases with the starting time T. This is due to the fact that the early time data has higher signal-to-noise ratio than the data at later time; by definition, $\sigma_T^2$ measures only the variance of the data and is insensitive to the fitting function.

Also shown in FIG. 3 is the product of $\chi_T^2$ and $\sigma_T^2$ given by 215 and the calculated capture cross section Σ, shown along with its estimated standard deviation, by the points 217a, 217b, . . . 217n. In the preferred embodiment of the present invention, the starting time T denoted by 221 corresponds to a value where Σ exhibits a plateau. It can be seen from FIG. 3 that the product of $\chi_T^2$ and $\sigma_T^2$ exhibits a minimum at the same time where Σ deviates from a plateau. This means that an updated starting time at which the product of $\chi_T^2$ and $\sigma_T^2$ exhibits a minimum may be used to determine a starting time at which the decay can be described by a single exponential. Moreover, the Σ calculated from a single exponential fit from this time forward should be the most accurate and statistically precise.

The extension of the method of the present invention to multiple exponentials is straightforward:, once the tail end of the decay spectrum has been described by a single exponential and a first starting time T determined, a new spectrum is obtained by subtracting the late exponential from the spectrum and repeating the procedure for additional exponents.

To test the validity of the method of the present invention, i.e., using a starting time for fitting based upon the product of the residual Chi-square the standard error of the fit, a large set of simulated data were generated to obtain the response of detectors under a variety of formation and borehole conditions. These are summarized in Table I.

TABLE I

FORMATION AND BOREHOLE PARAMETERS OF THE MODEL

| Parameter | Range |
|---|---|
| Formation Porosity | 0, 10, 20, 30 and 40 p.u. |
| Formation water salinity | 0, 50, 100, 200 and 300 kppm |
| Formation lithology | Sandstone |
| Borehole size | 6", 8.5" and 12.25" (open hole and cased hole) |
| Borehole salinity | 0, 5, 100, 200 and 300 kppm |

Figure 4:
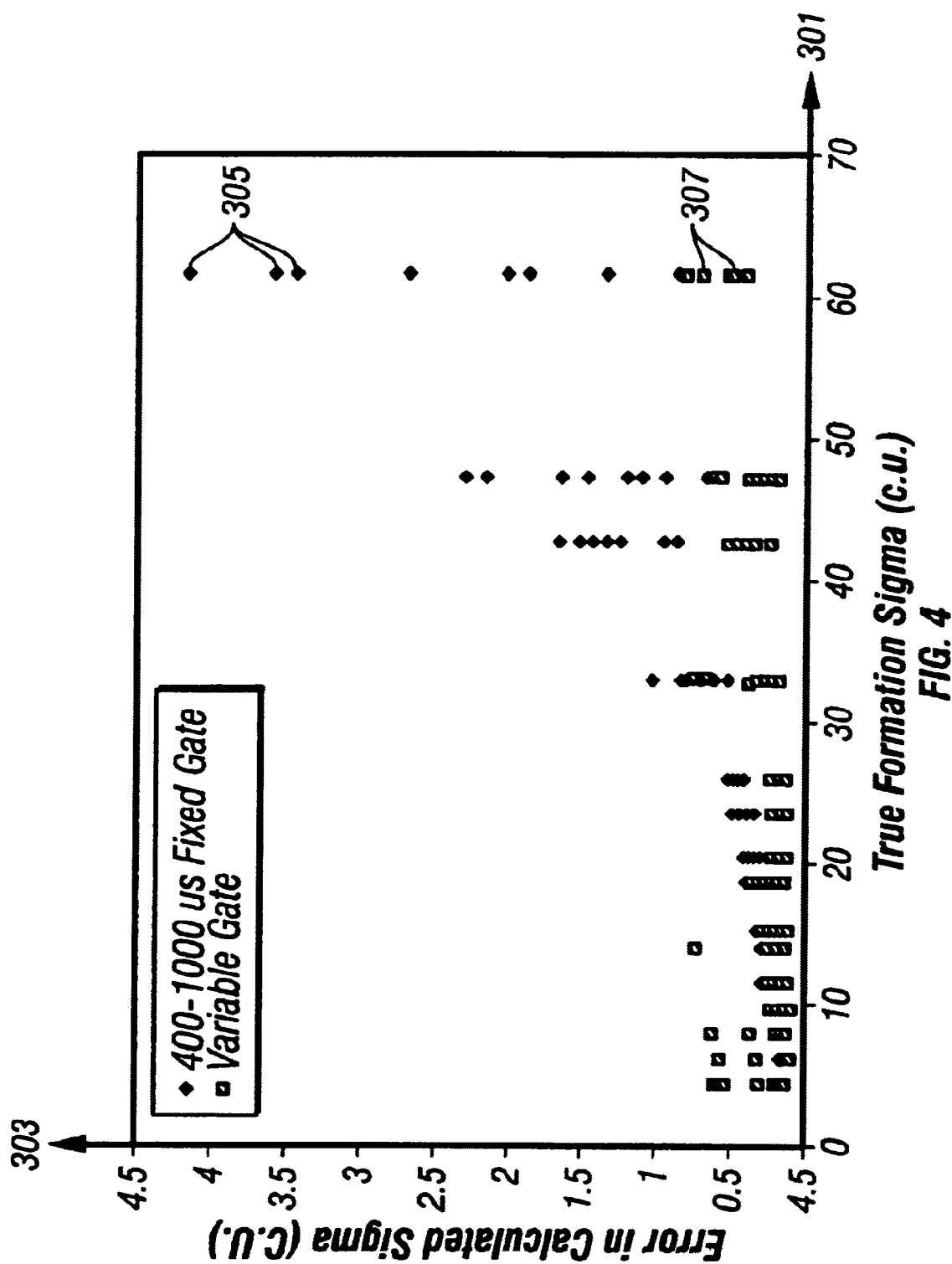
FIG. 4 shows a comparison of the result of using the method of the present invention with a prior art method on simulated decay data.

FIG. 4 shows a plot of the error in determination of the formation capture cross section (ordinate 303) as a function of the formation capture cross section (abscissa 301) for data obtained by simulation corresponding to Table I. The squares 307 correspond to determinations made using the method of the present invention while the diamonds 305 correspond to determinations made using a fixed gate starting at 400 ms. The present invention clearly gives more accurate determination of the cross section, particularly at high values of the formation cross section. The precision of the present method is slightly worse at low formation capture cross sections due to the fact that at these values of Σ, the prior art method starts too early and is contaminated with borehole decay, which produces an erroneous formation Σ.

In another aspect of the invention, the above process is implemented with no significant increase in computation time over a single least-squares minimization. Those versed in the art would recognize that the least squares procedure requires the summing of the variables $y_i$, $t_i$, and $t_i^2$ from eq. (4) over all time windows from $I_T$ to N. These values are stored in the computer memory. With values stored for these variables for each value of i, once the summation has been performed for any value of I, the summation for the next value of I only requires additions from the values stored in memory and no additional multiplications are required. The additions add relatively little to the computation time.

While the foregoing disclosure is directed to the preferred embodiments of the invention, various modifications will be apparent to those skilled in the art. Specifically, in the logging of subterranean formations, other types of measurements may also be made that comprise at least two exponential decay components. It is intended that all variations within the scope and spirit of the appended claims be embraced by the foregoing disclosure.

What is claimed is:

1. A method for determining a parameter of interest of a subterranean formation comprising:

(a) conveying a logging tool into a borehole in said subterranean formation and using at least one detector on the logging tool to obtain measurements related to the parameter of interest, said measurements comprising at least two exponentially decaying components;

(b) defining a plurality of starting times for analysis of said measurements;

(c) fitting said measurements over a plurality of time windows between said starting times and a selected ending time, thereby defining a plurality of fits, said selected ending time being greater than each of said starting times;

(d) determining a goodness of fit, a standard error of fit, and a product of said goodness of fit and said standard error of fit for each of the plurality of fits in (c); and (e) selecting a value from said plurality of starting times for which said product attains a minimum value.

2. The method of claim 1 wherein said parameter of interest comprises a thermal neutron capture cross section of the formation, the logging tool comprises a pulsed neutron instrument and said measurements comprise capture counts of gamma rays.

3. The method of claim 1 wherein said at least two exponentially decaying components further comprises at least three exponentially decaying components, the method further comprising (i) subtracting from said measurements the fit to said measurements corresponding to said value of the starting time selected in (e) of claim 1, and (ii) repeating steps (b)–(e) of claim 1.

4. The method of claim 1 wherein obtaining said goodness of fit and standard error of fit further comprises storing values of time of said measurements, said measurements and squares of said times in a computer memory.

5. The method of claim 1 wherein determining the goodness of fit comprises determining a chi-squared value for the fit.

6. The method of claim 1 wherein further comprising selected said ending time so that said measurements at said ending time consist primarily of on exponentially decaying component.

* * * * *